(12) United States Patent
Yonge, III et al.

(10) Patent No.: US 7,688,904 B2
(45) Date of Patent: Mar. 30, 2010

(54) GENERATING SIGNALS FOR TRANSMISSION OF INFORMATION

(75) Inventors: Lawrence W. Yonge, III, Ocala, FL (US); Timothy J. VanderMey, Altamonte Springs, FL (US)

(73) Assignee: Intellon Corporation, Ocala, FL (US)

( * ) Notice: Subject to any disclaimer, the term of this patent is extended or adjusted under 35 U.S.C. 154(b) by 1038 days.

(21) Appl. No.: 11/347,002

(22) Filed: Feb. 3, 2006

(65) Prior Publication Data
US 2006/0256883 A1 Nov. 16, 2006

Related U.S. Application Data

(63) Continuation-in-part of application No. 11/127,401, filed on May 12, 2005.

(51) Int. Cl.
*H04K 1/10* (2006.01)
*H04L 7/06* (2006.01)

(52) U.S. Cl. .................. 375/260; 375/295; 375/354; 375/363; 375/364; 375/365; 375/366; 370/208; 370/210

(58) Field of Classification Search .................. 375/260, 375/295, 354, 359–368; 370/203, 208, 210
See application file for complete search history.

(56) References Cited

U.S. PATENT DOCUMENTS

| | | | |
|---|---|---|---|
| 6,074,086 A | 6/2000 | Yonge, III | |
| 6,111,919 A | 8/2000 | Yonge, III | |
| 6,269,132 B1 | 7/2001 | Yonge, III | |
| 6,553,080 B2 * | 4/2003 | Resnikoff et al. | 375/271 |
| 7,227,902 B2 * | 6/2007 | Hellberg | 375/259 |
| 7,313,193 B2 * | 12/2007 | Laroia | 375/267 |
| 7,317,750 B2 * | 1/2008 | Shattil | 375/146 |
| 2003/0058952 A1 * | 3/2003 | Webster et al. | 375/260 |
| 2003/0223353 A1 * | 12/2003 | Wallace | 370/206 |
| 2006/0256708 A1 * | 11/2006 | Wang et al. | 370/206 |

OTHER PUBLICATIONS

IEEE 802.11a standard (Sep. 1999).*

* cited by examiner

*Primary Examiner*—Mohammad H Ghayour
*Assistant Examiner*—Sophia Vlahos
(74) *Attorney, Agent, or Firm*—Fish & Richardson P.C.

(57) ABSTRACT

A method and system for transmitting signals between communication nodes is presented. The method includes generating a first waveform that includes a shaped portion; generating a second waveform that includes a shaped portion; and combining the first and second waveforms including overlapping the shaped portion of the first waveform with the shaped portion of the second waveform and adding the overlapped portions of the waveforms. The method includes generating a signal including the combined first and second waveforms. At least one of the first and second waveforms includes a characteristic signature configured for synchronizing with the signal.

16 Claims, 12 Drawing Sheets

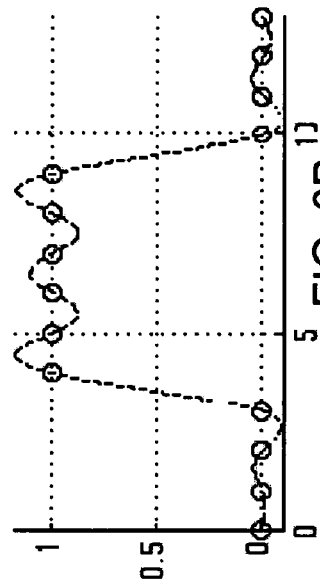
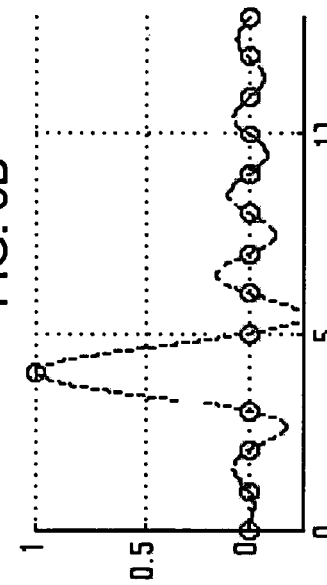
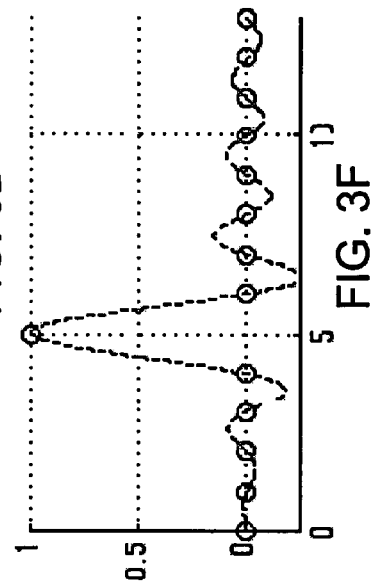
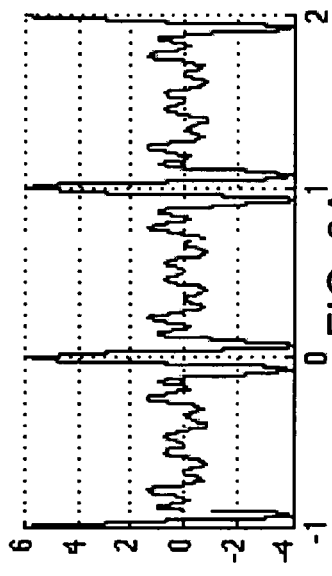
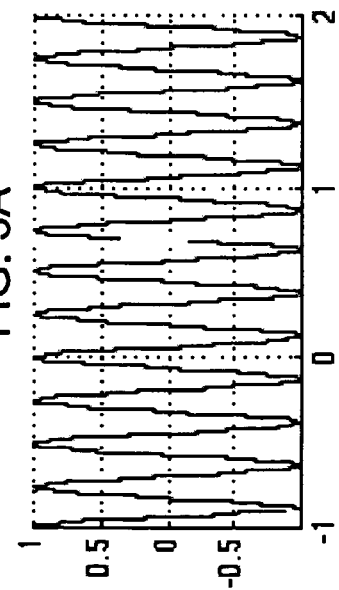
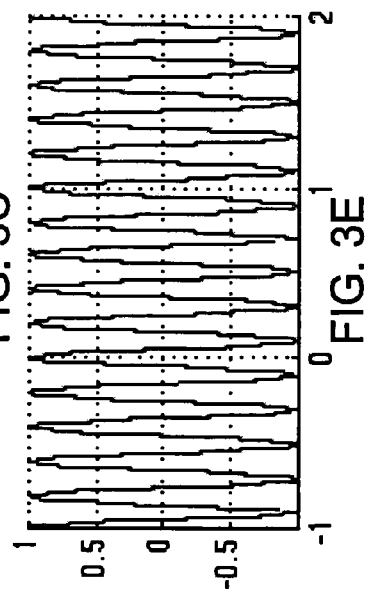

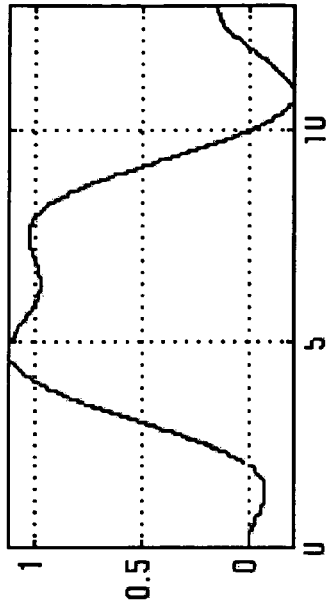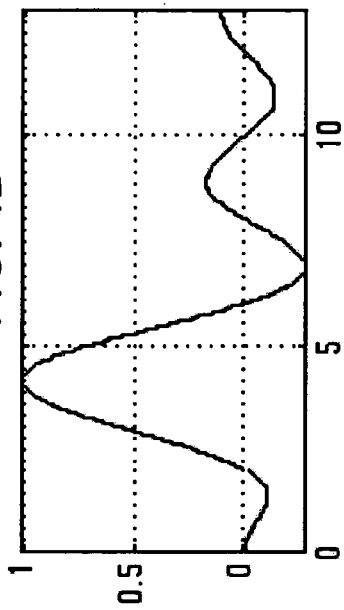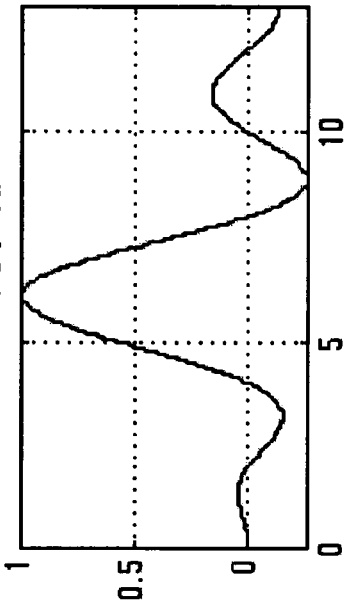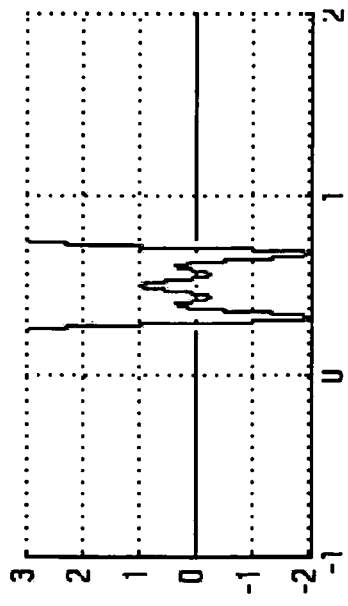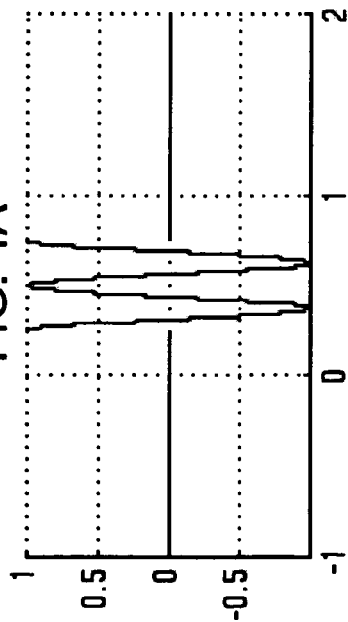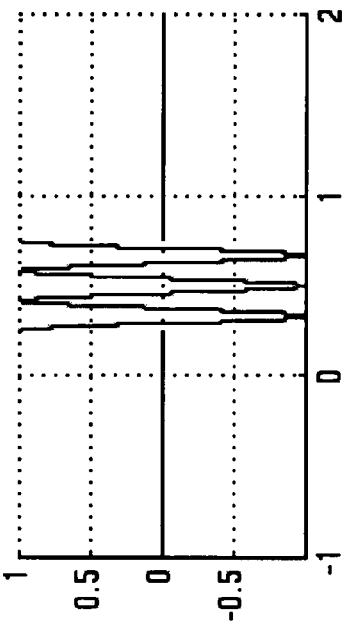

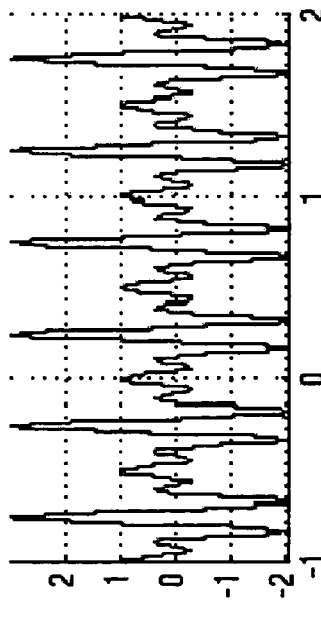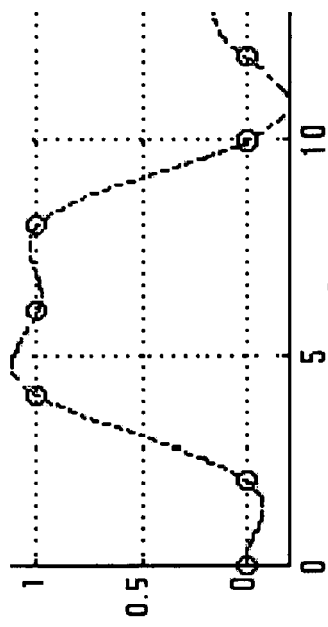
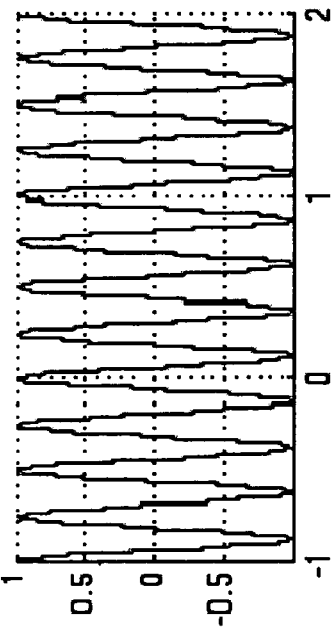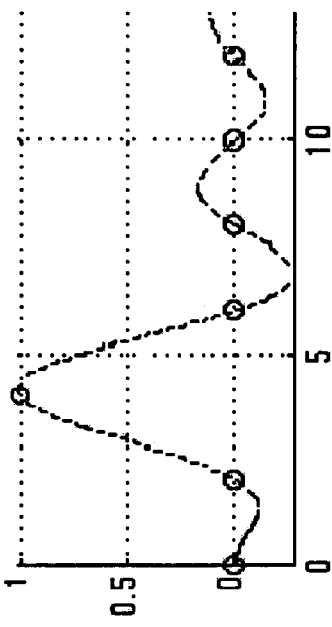
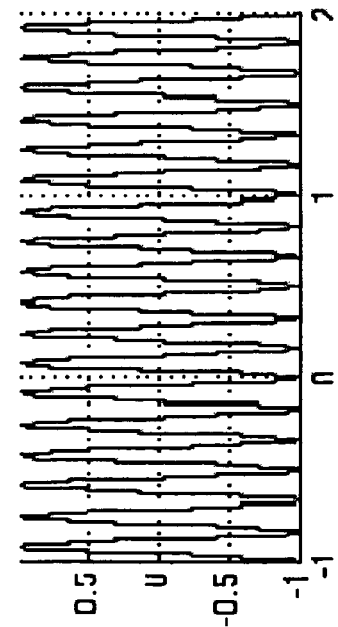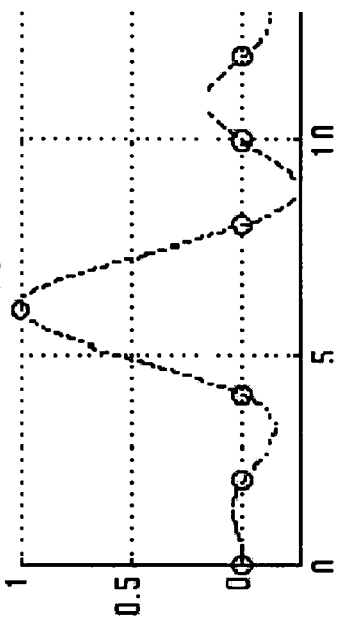

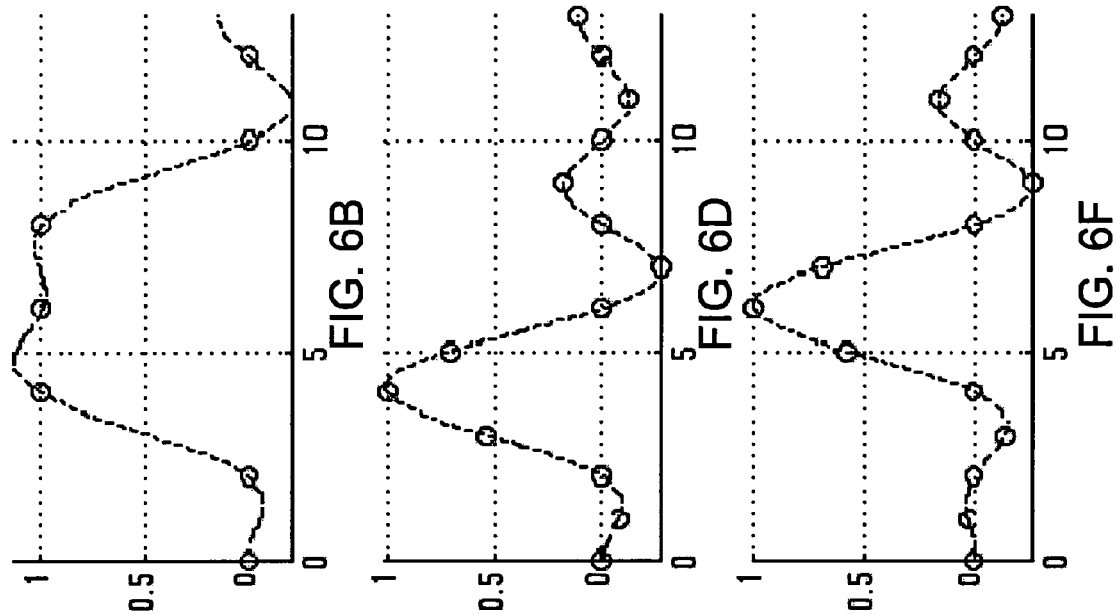
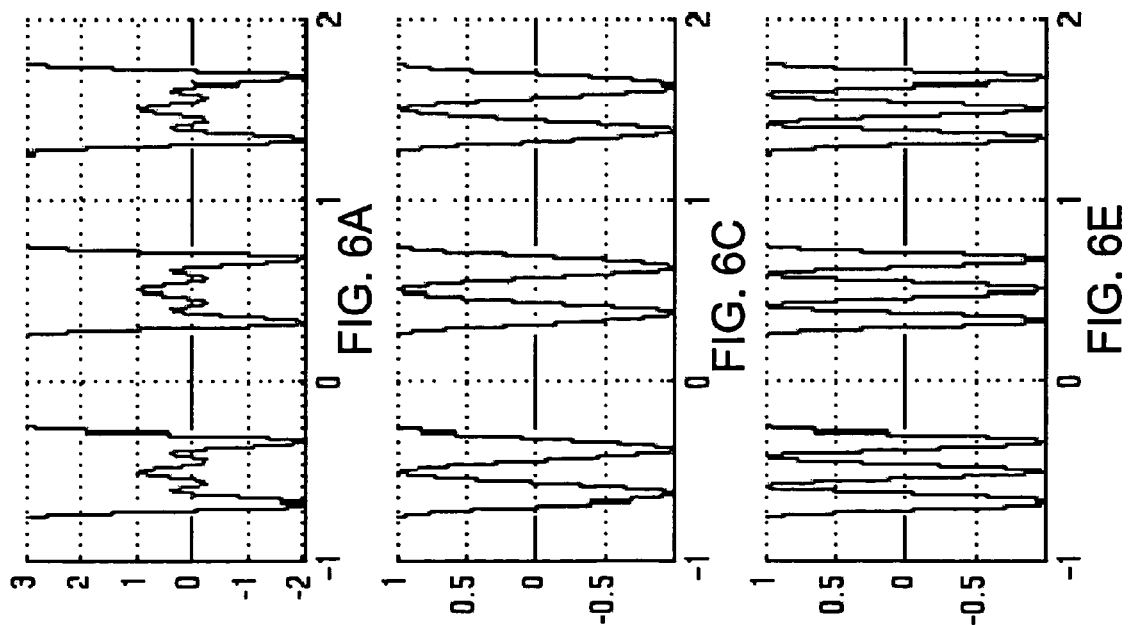

GENERATING SIGNALS FOR TRANSMISSION OF INFORMATION

CROSS-REFERENCE TO RELATED APPLICATIONS

This application is a continuation-in-part application of, and claims priority to, U.S. application Ser. No. 11/127,401, filed on May 12, 2005, incorporated herein by reference.

TECHNICAL FIELD

The invention relates to generating signals for transmission of information.

BACKGROUND

Orthogonal Frequency Division Multiplexing (OFDM) is a spread spectrum technology in which the available bandwidth is subdivided into a number of channels or carriers whose spectra are orthogonal to each other. Each carrier has a well defined peak frequency. Data are transmitted in the form of symbols that have a predetermined duration and encompass some number of carrier frequencies. The data transmitted on these carriers can be modulated in amplitude and/or phase, using modulation schemes such as Binary Phase Shift Key (BPSK), Quadrature Phase Shift Key (QPSK), or m-bit Quadrature Amplitude Modulation (m-QAM). In some cases, the spectrum of transmitted symbols is adapted to regulatory requirements using spectral filtering (e.g., a HAM radio band notch filter, or an out of band roll-off filter).

SUMMARY

In a general aspect, the invention features a method, and corresponding system, for transmitting signals between communication nodes. The method includes generating a first waveform that includes a shaped portion; generating a second waveform that includes a shaped portion; and combining the first and second waveforms including overlapping the shaped portion of the first waveform with the shaped portion of the second waveform and adding the overlapped portions of the waveforms. The method includes generating a signal including the combined first and second waveforms. At least one of the first and second waveforms includes a characteristic signature configured for synchronizing with the signal.

Implementations of this aspect of the invention may incorporate one or more of the following:

Each of the first and second waveforms comprises a plurality of symbols, and each symbol comprises a plurality of carrier waveforms.

Each of the plurality of carrier waveforms comprises a portion of a sinusoid.

The plurality of symbols of the first waveform occur in consecutive time slots.

The plurality of symbols of the second waveform occur in consecutive time slots.

The characteristic signature comprises a transition between adjacent symbols of the first waveform.

Each symbol of the first waveform occurring before the transition has a first set of phases for respective carrier waveforms, each symbol of the first waveform occurring after the transition has a second set of phases for respective carrier waveforms, and each of the second set of phases corresponds to a phase in the first set for a corresponding carrier waveform shifted by a constant phase.

The constant phase is pi.

The overlapped portions of the first and second waveforms are respectively shaped such that adding the overlapped portions of the waveforms substantially reconstructs one of the symbols.

The overlapped portions of the first and second waveforms are respectively shaped to form the reconstructed symbol having a smooth transition between a symbol of the first waveform and a symbol of the second waveform.

The overlapped portions of the first and second waveforms are respectively shaped to reduce amplitudes of frequency components corresponding to discontinuities associated with a transition between a symbol of the first waveform and a symbol of the second waveform.

The first and second waveforms are each generated from stored frequency samples of a Fourier transform of a plurality of orthogonal frequency division multiplexing symbols.

The first and second waveforms are each generated from the same set of stored frequency samples.

The first and second waveforms are each generated from an inverse discrete Fourier transform of a subset of the stored frequency samples.

The subset excludes frequency samples based on transmit spectrum regulatory requirements.

The first waveform is generated from a first portion of the inverse discrete Fourier transform, the second waveform is generated from a second portion of the inverse discrete Fourier transform, and the length of the combined first and second waveforms is longer than the length of the inverse discrete Fourier transform.

The first waveform includes the characteristic signature and at least a portion of the first waveform occurs earlier in the signal than the second waveform, and the second waveform includes a symbol carrying modulated data adjacent to the shaped portion of the second waveform.

The method further includes decoding the overhead portion, after synchronizing with the signal based on the characteristic signature.

Among the many advantages of the invention (some of which may be achieved only in some of its various aspects and implementations) are the following.

Nodes of a network can support multiple modes of communication having different symbol characteristics. For example, a dual mode system can communicate with a legacy single mode system using one type of symbols and with other dual mode systems using another type of symbols. The dual mode system can generate symbols of different lengths using the same processing module by storing the appropriate data in one or more lookup tables.

A dual mode system can generate a preamble for signals compatible with a legacy system without requiring the dual mode system to include all of the hardware of the legacy system. The preamble for communicating with the legacy system is not necessarily identical to a preamble generated by the legacy system, but is similar enough to provide robust detection of the compatible signals, while providing flexible spectral shaping to meet transmit spectrum regulatory requirements of different countries.

Other features and advantages of the invention will be found in the detailed description, drawings, and claims.

DESCRIPTION OF DRAWINGS

FIGS. 2A-2F, 3A-3F, 4A-4F, 5A-5F, and 6A-6F are time-domain and frequency-domain plots of OFDM symbols.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

System Overview

In OFDM transmission, data are transmitted in the form of OFDM "symbols." Each symbol has a predetermined time duration or "symbol time" $T_s$. Each symbol is generated from a superposition of N sinusoidal carrier waveforms that are orthogonal to each other and form the OFDM "carriers." Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 1:
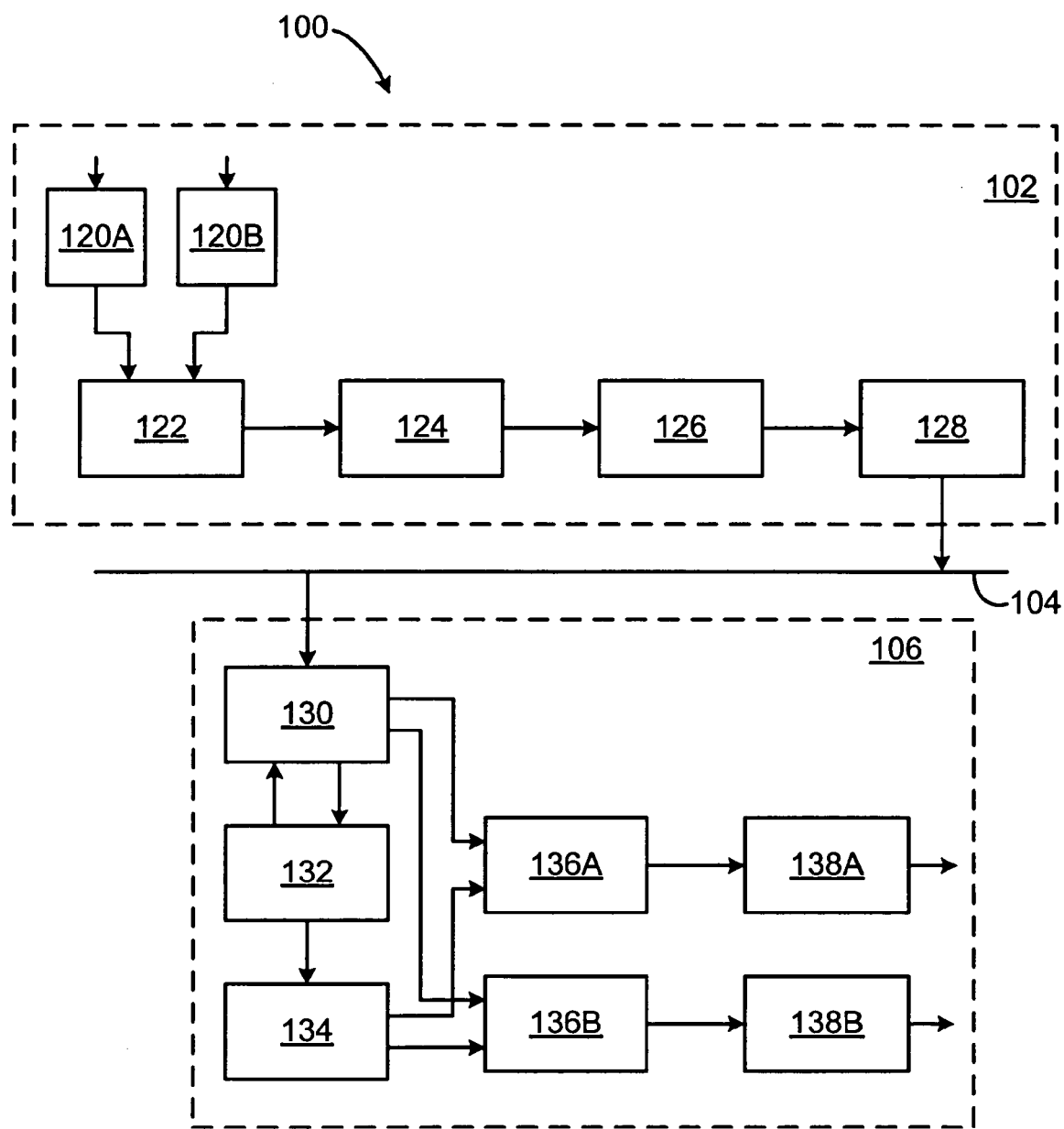
FIG. 1 is a block diagram of a communication system.

Referring to FIG. 1, a communication system 100 includes a transmitter 102 for transmitting a signal (e.g., a sequence of OFDM symbols) over a communication medium 104 to a receiver 106. The transmitter 102 and receiver 106 can be incorporated into nodes of a communication network (e.g., as part of a transceiver) in which each node transmits and receives signals over the shared communication medium 104. For example, the communication medium 104 can include a power line medium that uses existing AC wiring in a house to exchange information between nodes that interface with AC outlets. Due to their being designed for much lower frequency transmissions, AC wiring exhibits varying channel characteristics at the higher frequencies used for data transmission (e.g., depending on the wiring used and the actual layout). The use of OFDM signals can improve reliability of communication in such cases due to, for example, their resilience to narrow band interference, and their robustness to impulsive noise.

The communication system 100 is capable of supporting multiple modes that have different physical (PHY) layer signaling characteristics. Such multiple mode operation is useful, for example, to enable coexistence of standard devices and legacy devices in the same network. The legacy devices may communicate using signals having a first set of characteristics (called "mode A"). The upgraded standard devices may communicate using signals having a second set of characteristics (called "mode B"). Enabling the standard devices to communicate using either mode A or mode B signaling facilitates the coexistence of the standard and legacy devices.

Though transmitter 102 and receiver 106 are illustrated and described as supporting two modes, any number of modes can be supported.

At the transmitter 102, modules implementing the PHY layer receive an input bit stream from a medium access control (MAC) layer. The bit stream is fed into either an encoder module 120A or an encoder module 120B to perform the appropriate processing such as scrambling, error correction coding and interleaving according to the mode, A or B, respectively.

The encoded bit stream is fed into a mapping module 122 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 122 also determines which of the carrier frequencies $f_1, \ldots, f_N$ within the OFDM bandwidth are used by the system 100 to transmit information. For example, some carriers that are experiencing fades can be avoided, and no information is transmitted on those carriers. Instead, the mapping module 122 uses coherent BPSK modulated with a binary value from the Pseudo Noise (PN) sequence for that carrier. For some carriers (e.g., a carrier i=10) that correspond to restricted bands (e.g., an amateur radio band) no energy is transmitted on those carriers (e.g., $A_{10}=0$).

An inverse discrete Fourier transform (IDFT) module 124 performs the modulation of the resulting set of N complex numbers (some of which may be zero for unused carriers) determined by the mapping module 122 onto N orthogonal carrier waveforms having peak frequencies $f_1, \ldots, f_N$. The modulated carriers are combined by IDFT module 124 to form a discrete time symbol waveform S(n) (for a sampling rate $f_R$), which can be written as $$S(n) = \sum_{i=1}^{N} A_i \exp[j(2\pi in/N + \Phi_i)] \qquad \text{Eq. (1)}$$

where the time index n goes from 1 to N, $A_i$ is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 126 combines a sequence of consecutive (potentially overlapping) symbols into a "symbol set" that can be transmitted as a continuous block over the communication medium 104. The post-processing module 126 prepends a preamble to the symbol set that can be used for automatic gain control (AGC) and symbol timing synchronization. For example, the preamble can include predetermined repeating pattern of chirped symbols. One preamble pattern starts with an initial sequence of "SYNCP" symbols, followed by a sequence of "SYNCM" symbols, which are SYNCP symbols with a 180 degree phase shift on each carrier. To synchronize with a signal including this preamble, a receiver detects the transition between the SYNCP and SYNCM symbols (e.g., using autocorrelation). This transition (or other predetermined characteristic signature of the preamble) provides a timing reference used to set up symbol timing for processing the following symbols in the received signal.

To mitigate intersymbol and intercarrier interference (e.g., due to imperfections in the system 100 and/or the communication medium 104) the post-processing module 126 can extend each symbol with a cyclic prefix that is a copy of the last part of the symbol. The post-processing module 126 can also perform other functions such as applying a pulse shaping window to subsets of symbols within the symbol set (e.g., using a raised cosine window or other type of pulse shaping window) and overlapping the symbol subsets, as described in more detail below.

An Analog Front End (AFE) module 128 couples an analog signal containing a continuous-time (e.g., low-pass filtered) version of the symbol set to the communication medium 104. The effect of the transmission of the continuous-time version of the waveform S(t) over the communication medium 104 can be represented by convolution with a function $g(\tau;t)$ representing an impulse response of transmission over the communication medium. The communication medium 104 may add noise n(t), which may be random noise and/or narrowband noise emitted by a jammer.

At the receiver 106, modules implementing the PHY layer receive a signal from the communication medium 104 and generate a bit stream for the MAC layer according to the mode (A or B). An AFE module 130 operates in conjunction with an Automatic Gain Control (AGC) module 132 and a time synchronization module 134 to feed separate data paths for mode A and mode B. After synchronizing and amplifying a received symbol set using its preamble, the receiver 106 determines which mode the symbol set corresponds to by demodulating and decoding an initial portion of the symbol set indicating mode A or mode B.

If mode A is detected, the receiver 106 feeds the sampled discrete-time symbols into DFT module 136A to extract the sequence of N complex numbers representing the encoded data values (by performing an N-point DFT). Demodulator/Decoder module 138A maps the complex numbers onto the corresponding bit sequences and performs the appropriate decoding of the bits (including deinterleaving and descrambling). If mode B is detected, the receiver 106 feeds the sampled discrete-time symbols into DFT module 136B and Demodulator/Decoder module 138B. The sampling rate may be different for mode A and mode B.

Any of the modules of the communication system 100 including modules in the transmitter 102 or receiver 106 can be implemented in hardware, software, or a combination of hardware and software.

Multiple Mode Support

Any of a variety of techniques can be used to facilitate multiple mode support of the transmitter 102 and the receiver 106, depending on the differences in symbol characteristics among the modes. To illustrate some advantages of some of these techniques, we first consider an example in which a transmitter or receiver uses only one of mode A or mode B. For example, in one implementation, mode A corresponds to a 256-point IDFT/DFT at a 50 MHz sample rate to generate and receive mode A symbols having an unextended symbol time of 5.12 μs (256 samples spaced by 20 ns), and mode B corresponds to 3072-point IDFT/DFT with a 75 MHz sample rate to generate and receive mode B symbols having an unextended symbol time of 40.96 μs (3072 samples spaced by 13.3 ns). Since mode B has a larger symbol time than mode A, the carrier frequency spacing of mode B can be denser than the carrier frequency spacing of mode A. Furthermore, mode B uses a 5 μs raised cosine pulse shaping window at the beginning and end of each symbol, while mode A uses a 0.16 μs raised cosine pulse shaping window at the beginning and end of each symbol. These pulse shaping windows help to mitigate the spectral effects of discontinuities between successive symbols.

In addition to these differences, there are other system performance differences between the modes. In mode A, a transmitter uses additional spectral filtering of its transmit signal in order to meet a particular set of transmit spectrum requirements (e.g., HAM band notches and out of band roll-off). The filters used for mode A can be complex and costly, and add significant distortion to the signal (some measure of distortion compensation is attained by appropriately pre-distorting the IDFT values).

In mode B, with its significantly longer symbol time and its extended raised cosine pulse shaping, the transmit spectrum can be shaped to meet the spectral transmit requirements without necessarily requiring the use of such filters. For example, any frequencies which are zeroed in the IDFT will be highly attenuated in the transmitted power spectrum. This allows the transmit spectrum to be easily adapted to different regulatory requirements.

Because of these advantages of the mode B signal characteristics, it is desirable to implement a dual mode system that can generate mode A compatible symbols (i.e., symbols that appear to a receiver that they were generated by a mode A transmitter) using the mode B IDFT and extended raised cosine pulse shaping window. A technique for generating dual mode symbols is described in the following simplified example.

Simplified Dual Mode Example

The length of the mode A and mode B symbols described above differ by a factor of 8. In this simplified example, the length of mode A and mode B symbols differ by a factor of 2.

Figure 2A:
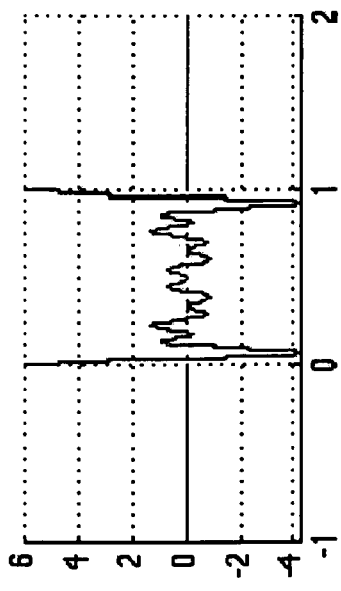
Figure 2B:
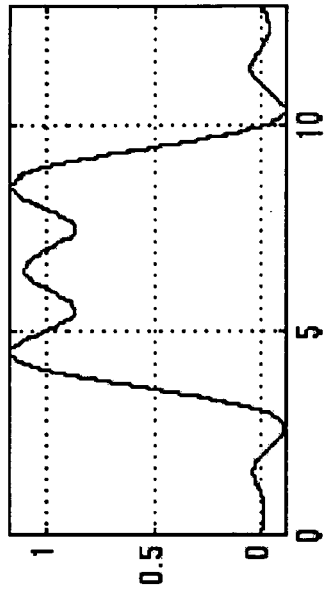
Figure 2C:
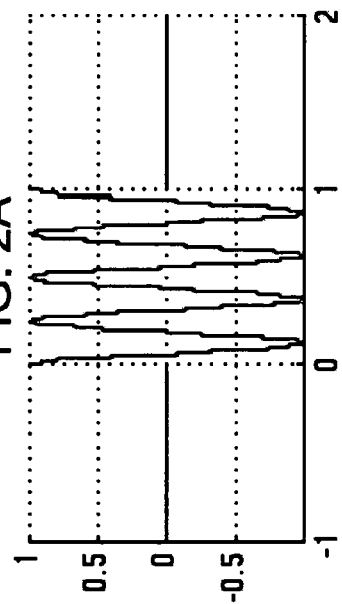
Figure 2D:
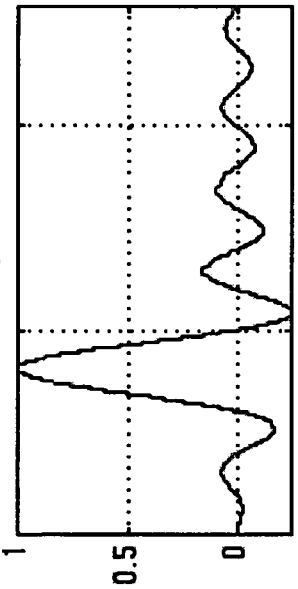
Figure 2E:
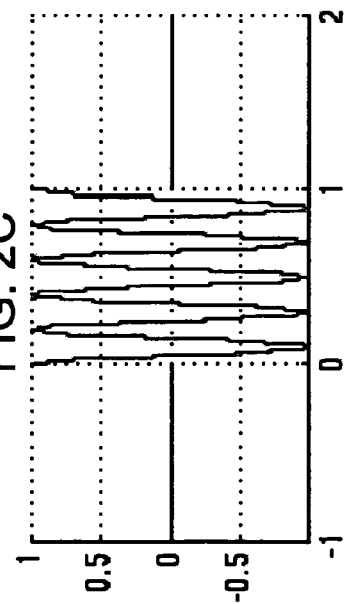
Figure 2F:
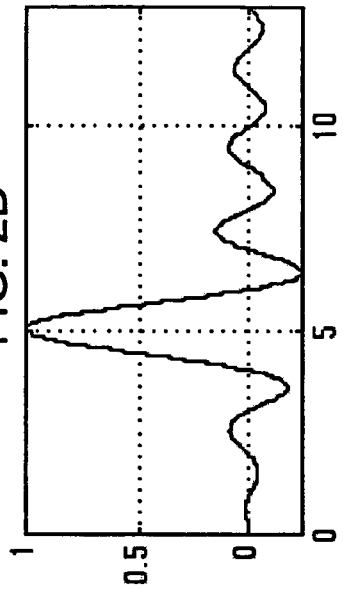

Referring to FIGS. 2A-2F, an exemplary mode B OFDM symbol (FIG. 2A) has a symbol time $T_s=T$ and is composed of a first set of six carriers having peak frequencies $f_1, \ldots, f_6$ that are integral multiples of the frequency interval $\Delta f=1/T$. In this case, the carriers are evenly spaced $f_1=4\Delta f, f_2=5\Delta f, \ldots, f_6=9\Delta f$, and are combined with equal amplitudes and phases (e.g., all $C_i=1$). The positive-frequency portion of the spectrum of the symbol in FIG. 2A is shown in FIG. 2B. FIGS. 2C and 2E show the first two carrier waveforms at frequencies $f_1$ and $f_2$, respectively. FIGS. 2D and 2F show the corresponding positive-frequency spectra of these first two carrier waveforms.

To generate the symbol in FIG. 2A, an IDFT module effectively uses discrete-frequency samples of the spectrum of each carrier waveform as shown in FIGS. 3D and 3F. (These frequency samples represent DFT frequency components, and as such, extend over an entire period of a periodic spectrum that results from the time sampling inherent in a DFT calculation.) In this case the only nonzero frequency samples for each carrier are at the peak of the spectrum since the other samples fall on zeros of the carrier spectrum. The effect of this "frequency sampling" is to make the corresponding the time-domain carrier waveforms periodic, as shown in FIGS. 3C and 3E. The generated symbol is formed from one period of the resulting periodic waveform shown in FIG. 3A. FIG. 3B shows the corresponding frequency components recovered after performing a mode B DFT on samples of the transmitted symbol.

Referring to FIGS. 4A-4F, an exemplary mode A OFDM symbol (FIG. 4A) has a symbol time $T_s=T/2$ and is composed of a second set of three carriers having peak frequencies $f_1, \ldots, f_3$ that are integral multiples of the frequency interval $\Delta f=2/T$. In this case, the carriers are also evenly spaced $f_1=4\Delta f, f_2=6\Delta f, f_3=8\Delta f$, and are combined with equal amplitudes and phases (e.g., all $C_i=1$). Also, the second set of carriers is a subset of the first set of carriers. The positive-frequency portion of the spectrum of the symbol in FIG. 4A is shown in FIG. 4B. FIGS. 4C and 4E show the first two carrier waveforms at frequencies $f_1$ and $f_2$, respectively. FIGS. 4D and 4F show the corresponding positive-frequency spectra of these first two carrier waveforms.

To generate the symbol in FIG. 4A, an IDFT module still uses discrete-frequency samples of the spectrum of each carrier waveform as shown in FIGS. 5D and 5F, but in this case the mode A samples are spaced further apart than the mode B samples by a factor of 2 (since the symbol time of the mode A symbols is shorter than the symbol time of the mode B symbols by a factor of 2). However, there is still only one nonzero frequency sample for each carrier at the peak of its spectrum since the other samples fall on zeros of the carrier spectrum. This frequency sampling results in the periodic carrier waveforms shown in FIGS. 5C and 5E. The generated symbol corresponds to one period of the resulting periodic waveform shown in FIG. 5A. FIG. 5B shows the corresponding frequency components recovered after performing a mode A DFT on samples of the transmitted symbol.

FIGS. 6A-6F show exemplary waveforms and frequency sampled spectra for a system supporting dual mode symbol generation. The system can generate a mode B OFDM symbol as described above with reference to FIGS. 2A-2F and FIGS. 3A-3F. The system can also generate a mode A compatible OFDM symbol (FIG. 6A) that contains a shorter mode A symbol with length T/2 within the longer mode B symbol time $T_s=T$. This mode A compatible symbol is composed of the second set of three carriers having peak frequencies $f_1=4\Delta f, f_2=6\Delta f, f_3=8\Delta f$ that are integral multiples of the frequency interval $\Delta f=2/T$.

To generate the mode A compatible symbol corresponding to one period of the periodic waveform shown in FIG. 6A, the IDFT module 124 uses discrete-frequency samples of the spectrum of each carrier waveform as shown in FIGS. 6D and 6F at the denser mode B frequency spacing. This frequency sampling results in the periodic carrier waveforms shown in FIGS. 6C and 6E. FIG. 6B shows the corresponding frequency components recovered by a receiver expecting a mode A symbol and performing a mode A DFT on samples of the transmitted symbol.

In this case, more than one of the frequency samples of each carrier spectrum is nonzero. In fact, nonzero samples can extend over an entire period of the DFT spectrum. In a practical system it is sufficient to represent only a finite number of samples on either side of the peak since the magnitudes of the samples become smaller away from the peak. This is because the shape of the carrier spectrum is approximately that of a "sinc" function (i.e., $\text{sinc}(x)=\sin(\pi x)/(\pi x)$). (The illustrated positive-frequency carrier spectrum actually corresponds to the sum of two sinc functions centered at the positive and negative carrier frequency peak values.)

In this dual mode case as in the other cases in this simplified example, the carriers are combined with equal amplitudes and phases (e.g., all $C_i=1$), but in general the amplitudes and phases are modulated according to a respective data value. In this dual mode case, since each mode A carrier corresponds to multiple nonzero frequency samples, each of which is also a mode B carrier frequency, multiple waveform components are modulated according to the same data value, as described in more detail below. In addition to modulating the multiple components according to a data value, the components can be multiplied by a complex phase shift to move the T/2 length symbol to any position within the T length symbol (since a phase shift in the frequency domain corresponds to a time shift in the time domain). Other transformations can be performed on the symbols as well. For example, a pulse shaping window can be applied in the frequency domain by multiplying each component by an appropriate complex number (e.g., a DFT of a discrete time pulse shaping window).

In the DFT and IDFT calculations, the time domain is discrete as well, however, as long as the time sampling rate is large enough (e.g., least twice as large as the largest carrier frequency) the effect on the illustrated time-domain and frequency-domain representations is minimal.

Constructing Symbol Sets

Since the length in time of the mode B symbol is larger than the length in time of a mode A symbol (e.g., by a factor of 8 for the 5.12 μs long mode A symbols and 40.96 μs long mode B symbols described above), multiple mode A symbols can be sent in a time slot used by a mode B symbol. Thus in this example, a symbol set that normally includes 4 mode B symbols can include, for example, 32 mode A symbols.

In one implementation, the system generates a portion of a symbol set including multiple shorter mode A symbols by a process that includes: calculating the appropriate complex number $C_i$ for each mode B carrier frequency $f_i$ in a set of mode B carriers used to represent a mode A carrier, optionally applying an equivalent frequency domain representation of any symbol transformations being performed (e.g., a Fourier transform of a pulse shaping window if one is being used), and adding the resulting complex numbers from different carriers and/or symbols that use the same mode B carrier frequency index i. These values are calculated and stored for subsequent use in the IDFT module 124. First we describe the generation of the individual mode A symbols, then the generation of the symbol set.

Symbol Generation

In a first implementation, a process for generating a mode A symbol uses a "full spectrum" representation of each mode A carrier using all DFT values (or "frequency samples" corresponding to the more densely spaced mode B carrier frequencies). Data values are then modulated onto each mode A carrier by multiplying its respective DFT values with the appropriate complex number (determined by the data value and the modulation approach). The DFT values that are being modulated are optionally pre-processed based on the frequency domain representation of any pulse shaping and overlapping as described below. The IDFT of the resulting DFT values is calculated. The result of this IDFT is a time domain waveform where each mode A carrier of each mode A symbol of the symbol set is modulated by its respective data value.

For mode B symbols, the system 100 uses mode B carriers that are spaced in frequency at ⅛ the distance of the mode A carriers. Therefore, the number of mode B carriers needed to generate a full spectrum representation of a mode A symbol (assuming 76 mode A carriers are used) is approximately: 76 mode A carriers*8 mode B carriers per mode A carrier=608 mode B carriers. Assuming a symbol set of 5 symbols, the resulting memory requirements would be as follows.

Memory Per mode *A* carrier=608 complex words/carrier

Memory Per mode *A* symbol=608 complex words/carrier*76 mode *A* carriers=46,208 complex words/symbol Memory Per Symbol Set=46,208 complex words/symbol*5 symbols=231,040 complex words In some cases (e.g., for some high-speed embedded applications), the memory resources and/or computational resources used in this example make a second implementation discussed below, which greatly reduces the memory and processing resources, more appropriate.

As described above, the largest values of the mode A carrier spectrum are at the peak frequency and at the adjacent and nearby frequencies. Based on this observation, an approximation of a mode A carrier can be obtained by reducing the representative spectral data to only include the peak carrier frequency, plus some number of mode B carrier frequencies on either side of the peak. As would be expected, the more mode B carriers that are used to represent the mode A carrier, the more accurate the representation of the mode A carrier in the mode A symbol. Listed below are two examples which show the tradeoff between DFT data size and waveform distortion.

1) 15 total mode B carriers used to represent each mode A carrier yield a 22 dB signal-to-noise ratio(SNR) at the mode A receiver. This SNR is sufficient for QPSK modulation.

2) 39 total mode B carriers used to represent each mode A carrier yield a 30 dB SNR at the mode A receiver. This SNR is sufficient for 256-QAM modulation.

The resultant memory requirements for each of the above examples are shown below.

1) 15 total mode B carriers used to represent each mode A carrier:

Memory Per mode $A$ carrier=15 complex words/carrier

Memory Per mode $A$ symbol=15 complex words/carrier*76 mode $A$ carriers=1,140 complex words/symbol Memory Per Symbol Set=1,140 complex words/symbol*5 symbols=5,700 complex words 2) 39 total mode B carriers used to represent each mode A carrier:

Memory Per mode $A$ carrier=39 complex words/carrier

Memory Per mode $A$ symbol=39 complex words/carrier*76 mode $A$ carriers=2,964 complex words/symbol Memory Per Symbol Set=2,964 complex words/symbol*5 symbols=14,820 complex words As can be seen from the above examples, using a subset of the mode B carriers to represent each mode A carrier can attain a significant reduction in required memory.

However, if this implementation is to be made practical for embedded real-time applications, not only should the memory resources used be reduced, but so should the computational resources. Explained below is a method for modulating (multiplying) and summing the mode A carrier information in a way that reduces resulting computational resources.

In some implementations, in order to reduce computational complexity and overhead, the system 100 computes the mode B symbol set data by sequentially addressing one mode B carrier at a time, thereby reducing the required computational hardware as compared to a parallel implementation. Since the mode B carriers have a frequency spacing that is 1/8th the pitch of the mode A carriers, if each mode A carrier is to be represented by a spectrum that has 9 or more mode B carriers, then the mode A carrier spectra will overlap in the frequency domain. If the mode A carrier spectra are to be constructed in such a way that their frequency components are addressed (indexed) by the using a corresponding mode B carrier number, then multiple lookup tables (or the equivalent thereof) will be needed in order to distinguish the frequency components that overlap in frequency. In some implementations, the mode B carrier data values stored in the lookup table not only represent the frequency components of a mode A carrier, but also include effects of the shorter mode A pulse shaping window, and a time shift including the option of overlapping a mode A symbol carrier waveform in time with adjacent mode A symbol carriers.

Figure 7A:
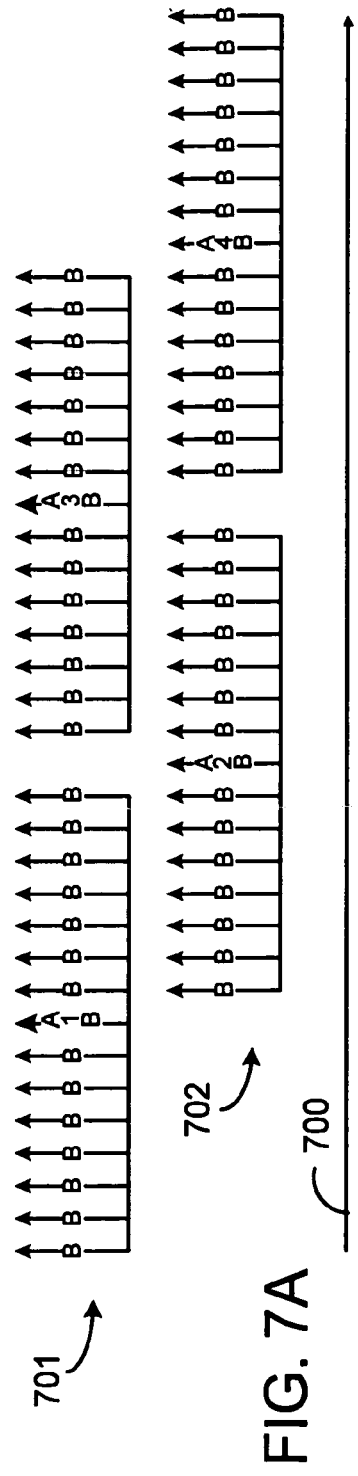
FIG. 7A is a diagram representing storage locations of carrier data values.

FIG. 7A shows an example in which each mode A carrier is represented by 15 total mode B carriers. A storage module accessible by the IDFT module 124 stores the lookup tables for accessing carrier data values indexed by peak frequency. In this example, frequency-indexed lookup table storage locations are shown with respect to a common frequency axis 700 for a first lookup table 701 of carrier data values stored in a first ROM and a second lookup table 702 of carrier data values stored in a second ROM (e.g., read-only memories (ROMs) addressed by a number representing the mode B peak carrier frequency). These ROMs provide two lookup tables in order to access the overlapping (in frequency) carrier data values for each mode A carrier spectrum. This example shows 4 mode A carriers, with mode B carrier data values for the two mode A carriers 1 and 3 stored in the first ROM, and mode B carrier data values for the two mode A carriers 2 and 4 stored in the second ROM. Other storage arrangements are possible. For example, a single ROM can store both lookup tables in separate address spaces.

Each of these 4 mode A carriers is associated with 15 mode B carriers (including the mode B carrier with the same frequency as the peak and 7 on either side of the peak). These mode B carriers represent the frequency components of a mode A carrier. Each of the corresponding 15 frequency components is multiplied by the same modulating data value. The 7 frequency components of the first mode A carrier that overlap with 7 frequency components of the second mode A carrier are then added, and likewise for the 7 overlapping components of the second and third, and third and fourth mode A carriers.

While it is possible to perform these multiply and add functions in parallel, a great deal of computational hardware would be required to realize such an implementation. In order to reduce the hardware requirements, some implementations perform these operations one mode B carrier at a time, thus reducing the required computational hardware.

Figure 7B:
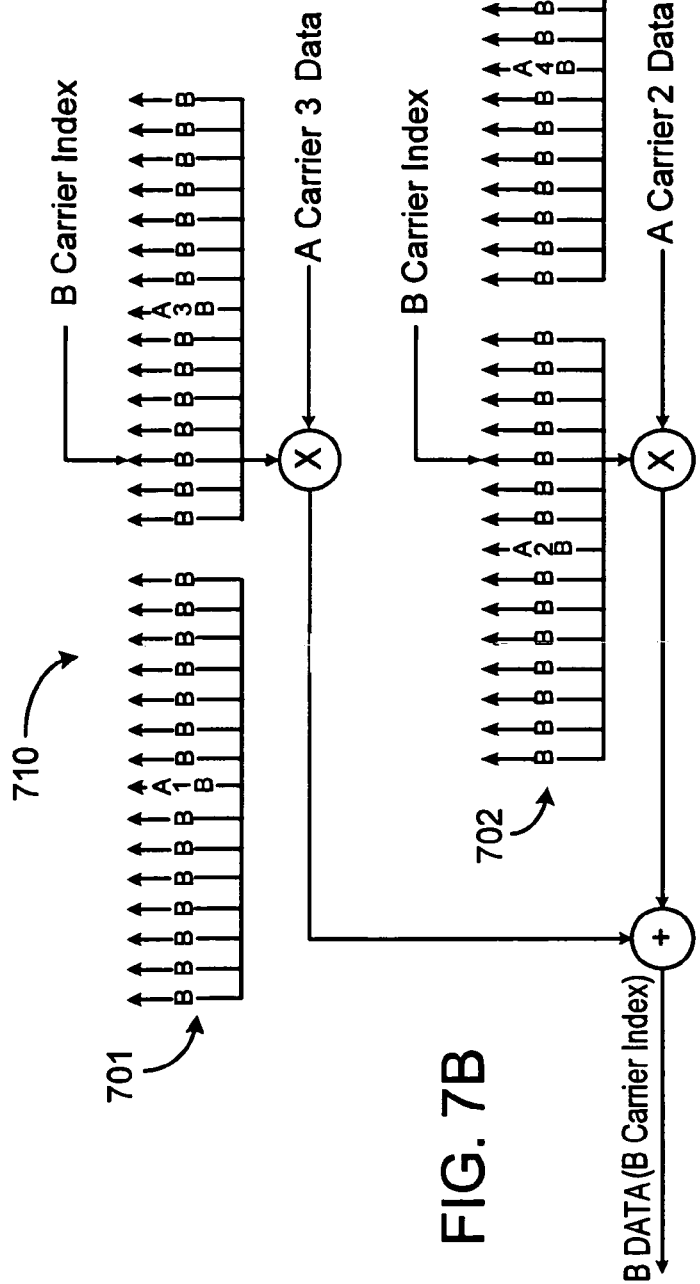
FIG. 7B is a schematic diagram of circuitry for combining carrier data values.

For example, referring to FIG. 7B, circuitry 710 indexes frequency components in each of the respective ROMs (indexed by mode B carrier number) and multiplies each frequency component by its corresponding modulating data value, and then adds the resulting modulated values from the ROMs that have the same mode B carrier number. This example uses 15 mode B carriers to represent each mode A carrier and therefore uses 2 separate ROMs to store overlapping spectral data. If additional mode B carriers were used to represent each mode A carrier, additional ROMs would be used to store the overlapping frequency components. The number of ROMs (or lookup tables) used can be determined by the following formula.

Number of Tables=floor((Number of mode $B$ carriers−1)/8)+1 where, "Number of mode B carriers" is and odd number.

For this example of 15 mode B carriers:

Number of Tables=floor((15−1)/8)+1=2

For the case of 39 mode B carriers:

Number of Tables=floor((39−1)/8)+1=5

Symbol Set Generation

A symbol set that is to be transmitted within a signal over the communication medium 104 may be constructed from shorter mode A symbols, longer mode B symbols, or a combination of mode A and mode B symbols, as described above. To attain the spectral performance inherent in the longer the longer mode B symbols, multiple (e.g., 4) mode A symbols can first be combined into a "symbol subset", and then multiple symbol subsets can be combined into a symbol set using the same processes and/or circuitry used to combine mode B symbols into a symbol set. The symbol subsets can also include a symbol fragment to prevent the longer mode B pulse shaping window from distorting the mode A symbols.

Figure 8:
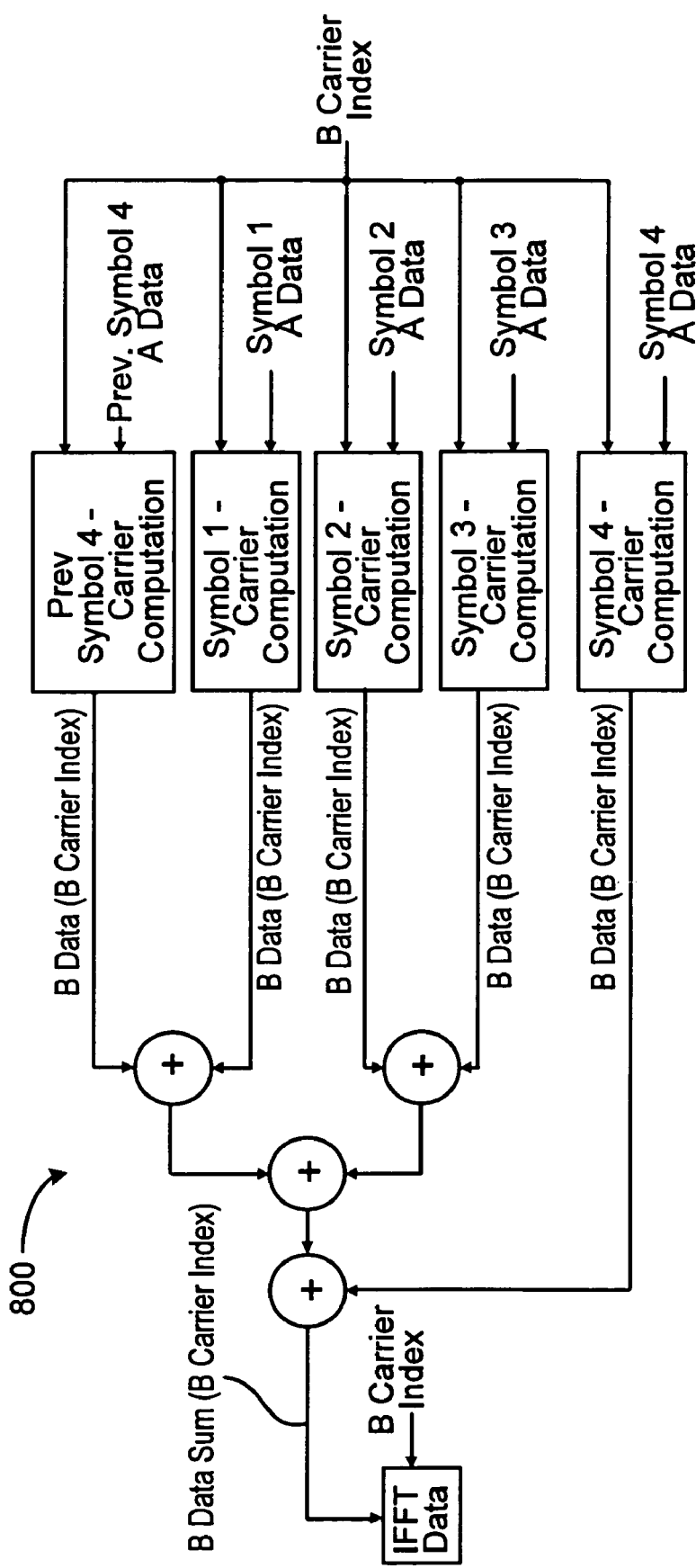
FIG. 8 is a schematic diagram of a frequency component computational module.

After the frequency components at a given mode B carrier index have been summed over different carriers in a mode A symbol (as shown in FIG. 7B), the frequency components at a given mode B carrier index should be summed over different mode A symbols in a symbol subset. FIG. 8 shows an exemplary frequency component computational module 800 included in the IDFT module 124 to perform these summations. The module 800 includes 4 adders and sequentially steps through the mode B carrier numbers. The resulting symbol subset includes 4 complete mode A symbols and a $5^{th}$ symbol fragment that represents the portion of a symbol from a previous symbol subset that is attenuated by a pulse shaping window, as described in more detail below.

Figure 9A:
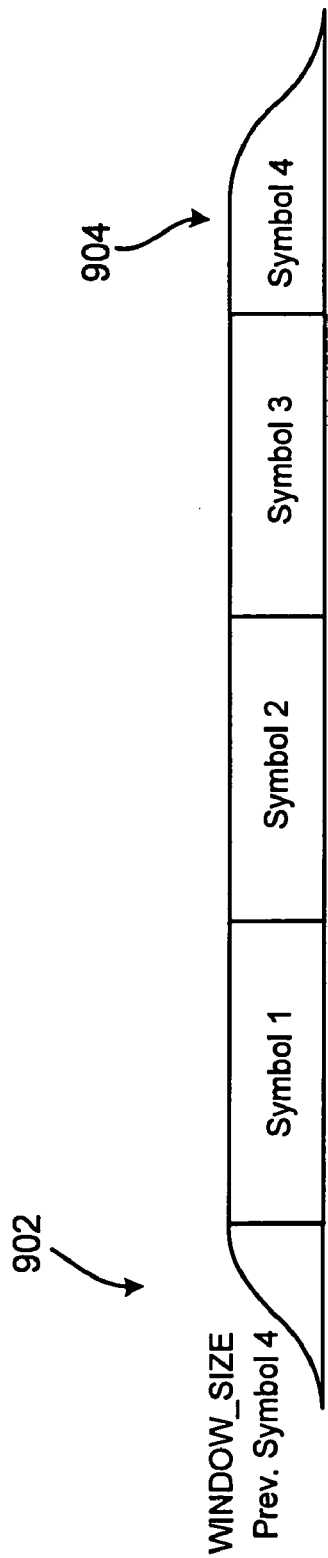
FIG. 9A is a diagram of a symbol subset waveform.

After the system 100 has computed and stored the final frequency component (DFT) value, the IDFT module 124 uses these values to generate a symbol subset waveform shown in FIG. 9A. This symbol subset generation process is repeated as needed. If the number of mode A symbols to be transmitted in a symbol set is not a multiple of 4, the final symbol subset includes only the necessary number of symbols to complete a symbol set. The symbol subset is shaped based on the position of its last symbol, using the terminal symbol pulse shaping technique described below.

Alternative implementations are possible. For example, in some implementations, the IDFT module 124 generates a waveform for each symbol and adds the respective waveforms to yield a symbol subset.

Pulse Shaping

A symbol set can include two types of pulse shaping: the shorter mode A pulse shaping window applied to individual mode A symbols within a symbol subset, and the longer mode B pulse shaping window applied to both the mode B symbols and the symbol subsets within the symbol set. As described above, the mode A windowing function can be applied to each mode A symbol in the frequency domain.

The longer mode B pulse shaping window is used in some implementations to achieve a desired spectral performance. However, when the pulse shaping window is applied to the ends of the mode A symbol subset, the mode A symbols that have been shaped may be so highly shaped that they are rendered unusable. When a symbol subset is shaped, the first and last samples of length WINDOW_SIZE (typically 384 samples) are attenuated by an appropriate pulse shaping window. If the attenuating portion of the pulse shaping window (of length WINDOW_SIZE) is not negligible compared to the length of a mode A symbol (e.g., 5%, 20%, 50%, or more of a mode A symbol), then this pulse shaping causes significant signal attenuation to the mode A symbol, however, its effects can be compensated for using the following pulse shaping technique.

Referring to FIG. 9A, the first symbol 902 of the symbol subset generated by the IDFT module 124 is a symbol fragment of length WINDOW_SIZE, and its stored DFT values correspond to the last WINDOW_SIZE waveform values of an unmodulated mode A symbol. This symbol fragment 902 is then modulated by the same data used to modulate the last symbol of the previous symbol subset, and is attenuated by the front portion of the pulse shaping window. The last symbol 904 of the symbol subset is attenuated by the rear portion of the pulse shaping window. As with the mode A pulse shaping, this mode B pulse shaping may be applied in the time domain, or alternatively may be applied in the frequency domain.

Figure 9B:
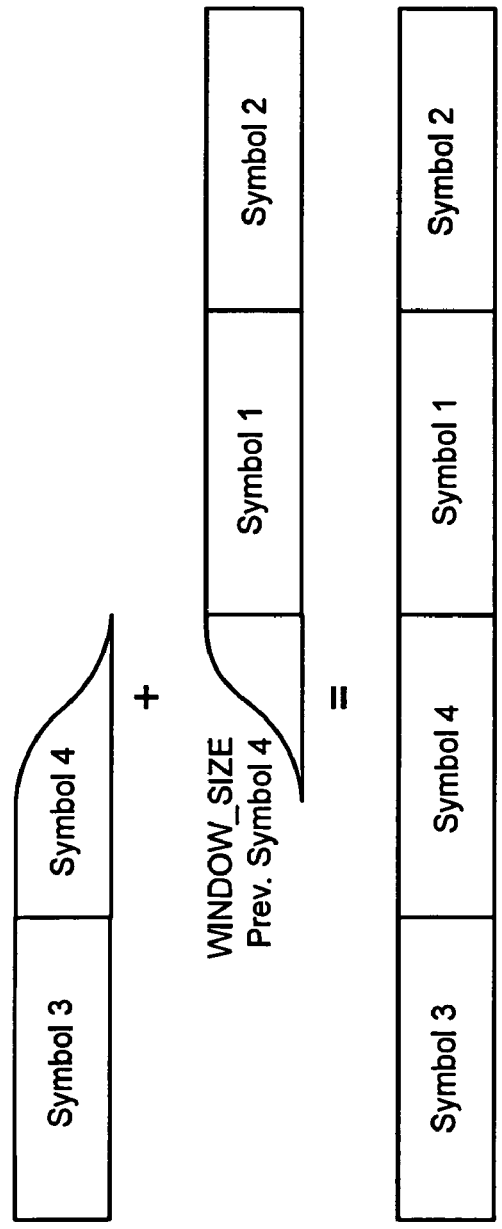
FIG. 9B is a diagram illustrating reconstruction of adjacent symbol subset waveforms.

When symbol subsets are concatenated into a symbol set for transmission, the current symbol subset is overlapped with the previous symbol subset by amount WINDOW_SIZE and the overlapped waveform values are added together. The result is that the attenuated mode A symbols are fully reconstructed between adjacent symbol subsets as shown in FIG. 9B.

At the front of the symbol set, the attenuated mode A symbol fragment carries redundant preamble information. This information is used to reconstruct the pulse shaped portion of the preamble using the overlap method described above. If the last mode A symbol to be transmitted is positioned as the last (i.e., fourth) symbol of the final symbol subset, the final symbol subset waveform is extended with a cyclic postfix of length WINDOW_SIZE, and the rear portion of the windowing function is applied to the postfix, thereby preserving the full amplitude of the last mode A symbol. If the last mode A symbol occurs at any other location in the final symbol set, the attenuation window is applied immediately following the end of the last mode A symbol. Using these methods, the unwanted attenuation effects of the pulse shaping window are removed allowing the transmission of contiguous and spectrally correct mode A compatible symbols.

Preamble Generation

The post-processing module (PPM) 126 prepends a preamble to a symbol set for synchronizing with the transmitted signal, as described above. The PPM 126 of a dual mode system is able to generate a mode B preamble, and mode A compatible preamble (i.e., a preamble that is similar enough to a preamble generated by a mode A transmitter to enable detection by a mode A receiver). Both types of preambles can be generated using the IDFT module 124. The PPM 126 prepends a mode A preamble to a symbol set containing mode A symbols or a combination of mode A and mode B symbols. The PPM 126 prepends a mode B preamble to a symbol set containing only mode B symbols.

The following examples use the implementation described above in which mode B symbols are 3072 samples spaced by 13.3 ns and mode A symbols are 384 samples spaced by 13.3 ns.

Figure 10A:
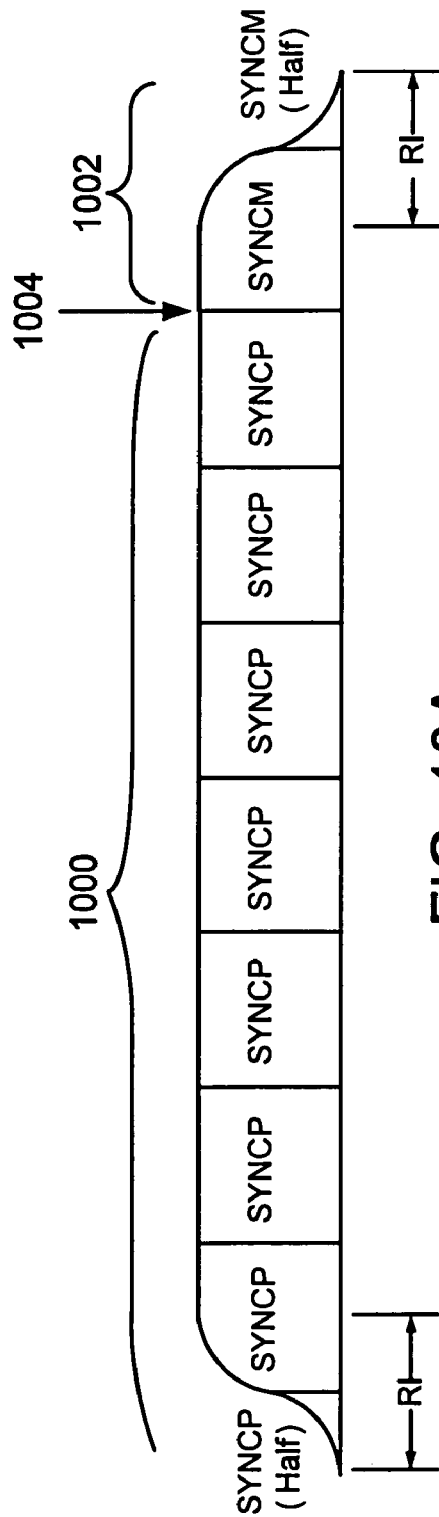
FIGS. 10A and 10B are diagrams of preamble waveforms.
Figure 10B:
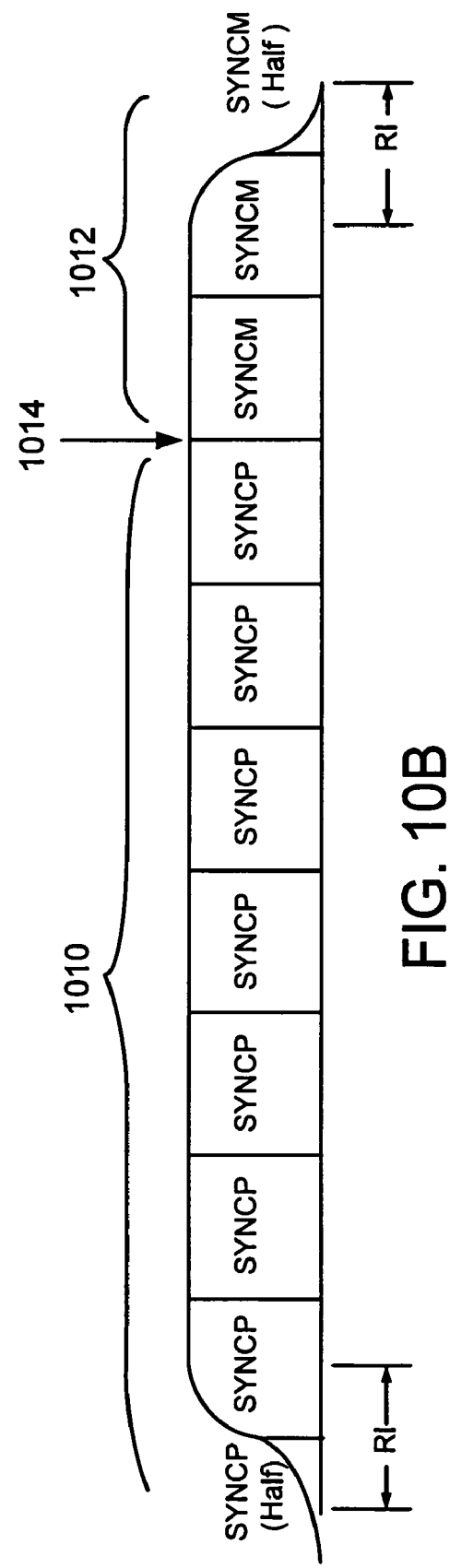

Referring to FIG. 10A, a mode A preamble includes a sequence 1000 of seven and a half SYNCP symbols, followed by a sequence 1002 of one and a half SYNCM symbols. The SYNCP and SYNCM symbols are each as long as a mode A symbol. Thus, the mode A preamble has a total length of nine mode A symbols. Referring to FIG. 10B, a mode B preamble includes a sequence 1010 of seven and a half SYNCP symbols, followed by a sequence 1012 of two and a half SYNCM symbols. Thus, the mode B preamble has a total length of ten mode A symbols.

The OFDM carriers of the SYNCP and SYNCM symbols are uniform amplitude carriers whose phases are selected to yield a chirped pulse. The phases of the carriers in a SYNCM symbol are shifted by 180 degrees relative to the phase of the corresponding carrier in the SYNCP symbol. Alternatively, another predetermined phase shift or another type of symbol can be used to enable a receiver to detect and synchronize with a characteristic signature in the preamble. A receiver detects a mode A (mode B) preamble, for example, using a matched filter to detect an autocorrelation peak indicating that the SYNCP-to-SYNCM symbol transition 1004 (1014) has been detected. A mode A receiver is configured to decode a first data symbol occurring one and a half mode A symbol lengths after the transition 1004, and a mode B receiver is configured to decode a first data symbol occurring two and a half mode A symbol lengths after the transition 1014.

A pulse shaping window attenuates the first and last samples of the mode A and mode B preambles over a roll-off interval RI samples long (e.g., RI=372 samples, slightly shorter than a mode A symbol). The first symbol carrying modulated data (e.g., frame control header data) is attenuated by a corresponding pulse shaping window and overlapped with the preamble waveform by RI samples. This provides a smooth transition between the preamble and the first data symbol to preserve the spectral shaping characteristics achieved using the mode A pulse shaping and mode B pulse shaping described above. For example, if the preamble were prepended to a data symbol without the pulse shaping, a discontinuity could occur between the preamble and the first data symbol leading to high-frequency spectral components that violate transmit spectrum requirements.

The attenuation at the beginning of the SYNCP sequences 1000 and 1010 does not significantly interfere with mode A or mode B preamble detection. Since approximately one and a half SYNCM symbols remain unattenuated at the end of the mode B SYNCM sequence 1012, robust preamble detection is preserved for the mode B preamble. Since only approximately one half of a SYNCM symbol remains unattenuated at the end of the mode A SYNCM sequence 1002, this attenuation could potentially interfere with mode A preamble detection. Therefore, the PPM 126 uses a reconstruction technique for appending the mode A preamble to recover the attenuated portion of the SYNCM symbols without introducing potential discontinuities, as described in more detail below.

In this example, the mode B preamble is not compatible with a mode A receiver since a mode A receiver is configured to decode a first data symbol occurring one and a half mode A symbol lengths after the transition 1004. Therefore, the following reconstruction technique is used to approximately reconstruct the attenuated portion of the SYNCM symbols, without introducing potential signal discontinuities, and start the first data symbol at the expected delay after the transition 1004.

Figure 11A:
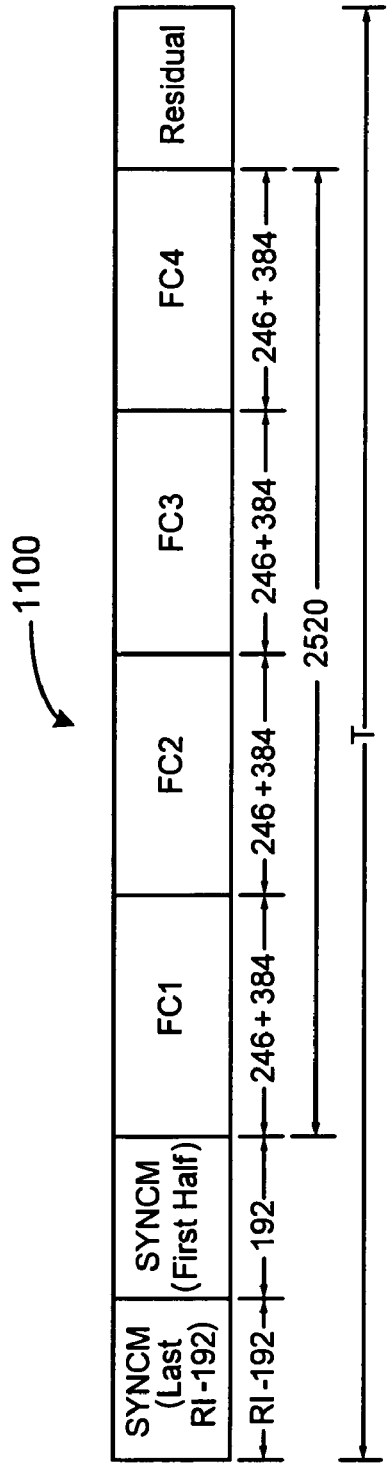
FIGS. 11A and 11B are diagrams of a data symbol.

Referring to FIG. 11A, the IDFT module 124 generates a data symbol 1100 including frame control information carried in four extended frame control symbols FC1-FC4 each having an extended length of 246+384=630 samples. The data symbol 1100 includes portions of SYNCM symbols at the front to approximately reconstruct the attenuated SYNCM symbols at the end of the sequence 1002. One portion of a SYNCM symbol adjacent to the FC1 symbol is 192 samples long, and another portion of a SYNCM symbol at the front of the data symbol 1100 is RI-192 samples long. The data symbol 1100 ends with a residual that is T-2520-RI samples long after the FC4 symbol. The length T of the symbol 1100 generated by the IDFT module 124 is T=3072 samples (the length of a mode B symbol). As described above, the IDFT module 124 generates the symbol 1100 turning off selected carriers to remove high-frequency spectral components caused, for example, by the transition between the SYNCM symbol portion and the FC1 symbol.

Figure 11B:
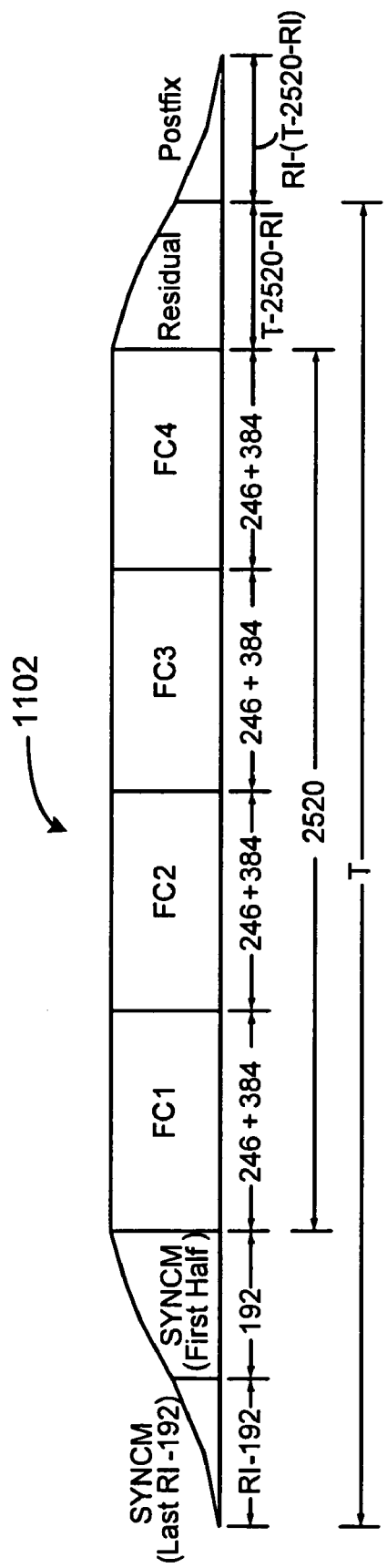

Referring to FIG. 11B, the PPM 126 extends the data symbol 1100 with a cyclic postfix after the residual such that the length of the residual and the postfix is RI samples long. In this way, when the PPM 126 attenuates the symbol 1100 with a pulse shaping window having a roll-off interval RI samples long, the last frame control symbol FC4 in the extended/shaped symbol 1102 is unattenuated. Furthermore, when the symbol 1100 is overlapped and added with another data symbol following the first data symbol 1100, the added RI samples of the following symbol will not interfere with the last frame control symbol FC4.

The PPM 126 overlaps the extended/shaped symbol 1102 with the mode A preamble and adds the RI overlapping samples. This adding of the overlapping samples approximately reconstructs the final SYNCM sequence 1002 to an unattenuated state. Since the SYNCM symbols (and SYNCP symbols) generated by the IDFT module 124 may not be identical to each other due to the spectral filtering incorporated into the IDFT module 124, the overlapped SYNCM symbols may not perfectly reconstruct a SYNCM symbol. However, the distortion in the reconstructed SYNCM symbols is not enough to significantly interfere with mode A preamble detection.

Figure 12A:
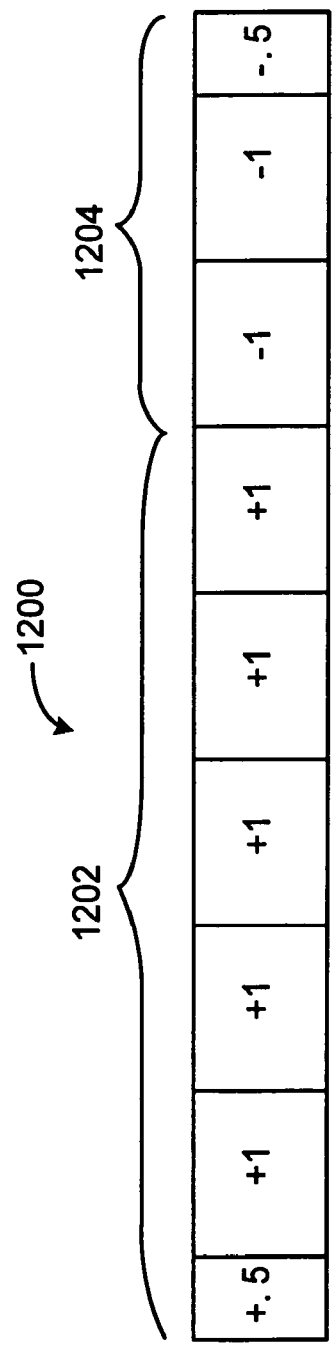
FIG. 12A is a diagram of a waveform generated by an IDFT module.
Figure 12B:
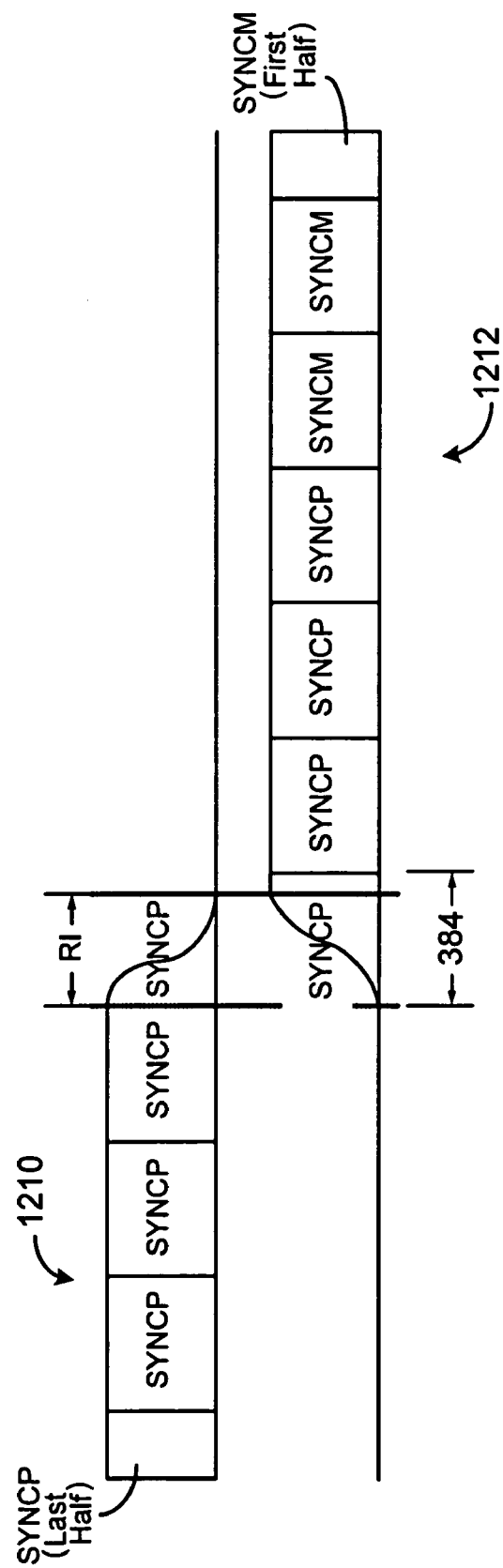
FIG. 12B is a diagram illustrating construction of a preamble waveform.

The PPM 126 uses a similar reconstruction technique for generating the mode A and mode B preambles. Since both the mode A preamble and the mode B preamble are longer than the IDFT module 124 symbol length T (3072 samples, or eight mode A symbol lengths), the IDFT module 124 generates two symbols which are used by the PPM module 126 to construct a single mode A or mode B preamble. FIGS. 12A and 12B illustrate a reconstruction process for generating a mode B preamble ten mode A symbols long. A similar reconstruction process is used to generate a mode A preamble nine mode A symbols long.

Referring to FIG. 12A, the IDFT module 124 is loaded (e.g., from a ROM) with DFT values for generating a time domain waveform 1200 having a sequence 1202 of five and a half SYNCP symbols, followed by a sequence 1204 of two and a half SYNCM symbols. The PPM 126 applies a first truncating and attenuating window function to one copy of the generated waveform 1200, to produce a first truncated/attenuated symbol 1210, and applies a second truncating and attenuating window function to another copy of the generated waveform 1200, to produce a second truncated/attenuated symbol 1212. Alternatively, the IDFT module 124 can generate the truncated/attenuated symbols 1210 and 1212 directly by having the appropriate DFT values loaded into the module.

The PPM 126 overlaps the symbols 1210 and 1212 by RI samples and adds the overlapped portions to generate a mode B preamble with seven and a half SYNCP symbols. This mode B preamble can then be attenuated and prepended as described above. Also described above, since different SYNCP symbols within the waveform generated by the IDFT module 124 may not be identical, this reconstruction technique creates a smooth transition between a SNCP symbol of the first waveform and a SYNCP symbol of the second waveform to preserve transmit spectral characteristics by not introducing abrupt phase discontinuities into the generated preamble.

Many other implementations other than those described above are within the invention, which is defined by the following claims.

What is claimed is:

1. A method for operating a transmitter that transmits signals between communication nodes, the method comprising:
generating a first waveform that includes a shaped portion;
generating a second waveform that includes a shaped portion;

combining the first and second waveforms including overlapping the shaped portion of the first waveform with the shaped portion of the second waveform and adding the overlapped portions of the waveforms; and generating a signal including the combined first and second waveforms;

wherein at least one of the first and second waveforms includes a characteristic signature configured for synchronizing with the signal, wherein the characteristic signature comprises a transition between adjacent symbols of the first waveform, and wherein each of the first and second waveforms comprises a plurality of symbols, and each symbol comprises a plurality of carrier waveforms, and wherein each symbol of the first waveform occurring before the transition has a first set of phases for respective carrier waveforms, each symbol of the first waveform occurring after the transition has a second set of phases for respective carrier waveforms, and each of the second set of phases corresponds to a phase in the first set for a corresponding carrier waveform shifted by a constant phase.

2. The method of claim 1, wherein each of the plurality of carrier waveforms comprises a portion of a sinusoid.

3. The method of claim 1, wherein the plurality of symbols of the first waveform occur in consecutive time slots.

4. The method of claim 3, wherein the plurality of symbols of the second waveform occur in consecutive time slots.

5. The method of claim 1, wherein the constant phase is pi.

6. The method of claim 1, wherein the overlapped portions of the first and second waveforms are respectively shaped such that adding the overlapped portions of the waveforms substantially reconstructs one of the symbols.

7. The method of claim 6, wherein the overlapped portions of the first and second waveforms are respectively shaped to form the reconstructed symbol having a smooth transition between a symbol of the first waveform and a symbol of the second waveform.

8. The method of claim 6, wherein the overlapped portions of the first and second waveforms are respectively shaped to reduce amplitudes of frequency components corresponding to discontinuities associated with a transition between a symbol of the first waveform and a symbol of the second waveform.

9. The method of claim 1, wherein the first and second waveforms are each generated from stored frequency samples of a Fourier transform of a plurality of orthogonal frequency division multiplexing symbols.

10. The method of claim 9, wherein the first and second waveforms are each generated from the same set of stored frequency samples.

11. The method of claim 9, wherein the first and second waveforms are each generated from an inverse discrete Fourier transform of a subset of the stored frequency samples.

12. The method of claim 11, wherein the subset excludes frequency samples based on transmit spectrum regulatory requirements.

13. The method of claim 11, wherein the first waveform is generated from a first portion of the inverse discrete Fourier transform, the second waveform is generated from a second portion of the inverse discrete Fourier transform, and the length of the combined first and second waveforms is longer than the length of the inverse discrete Fourier transform.

14. The method of claim 1, wherein:
the first waveform includes the characteristic signature and at least a portion of the first waveform occurs earlier in the signal than the second waveform; and
the second waveform includes a symbol carrying modulated data adjacent to the shaped portion of the second waveform.

15. The method of claim 14, further comprising decoding the modulated data, after synchronizing with the signal based on the characteristic signature.

16. A system for transmitting signals between communication nodes, comprising:
circuitry configured to generate a first waveform that includes a shaped portion;
circuitry configured to generate a second waveform that includes a shaped portion;
circuitry configured to combine the first and second waveforms including overlapping the shaped portion of the first waveform with the shaped portion of the second waveform and adding the overlapped portions of the waveforms; and
circuitry configured to generate a signal including the combined first and second waveforms;
wherein at least one of the first and second waveforms includes a characteristic signature used for synchronizing with the signal, wherein the characteristic signature comprises a transition between adjacent symbols of the first waveform, and
wherein each of the first and second waveforms comprises a plurality of symbols, and each symbol comprises a plurality of carrier waveforms; and
wherein each symbol of the first waveform occurring before the transition has a first set of phases for respective carrier waveforms, each symbol of the first waveform occurring after the transition has a second set of phases for respective carrier waveforms, and each of the second set of phases corresponds to a phase in the first set for a corresponding carrier waveform shifted by a constant phase.

* * * * *